(12) United States Patent
Kamei

(10) Patent No.: US 12,132,655 B2
(45) Date of Patent: Oct. 29, 2024

(54) POLICY DETERMINATION APPARATUS, POLICY DETERMINING METHOD AND PROGRAM

(71) Applicant: NTT Communications Corporation, Tokyo (JP)

(72) Inventor: Takayuki Kamei, Funabashi (JP)

(73) Assignee: NTT Communications Corporation, Tokyo (JP)

( * ) Notice: Subject to any disclaimer, the term of this patent is extended or adjusted under 35 U.S.C. 154(b) by 61 days.

(21) Appl. No.: 17/555,209

(22) Filed: Dec. 17, 2021

(65) Prior Publication Data

US 2022/0116324 A1 Apr. 14, 2022

Related U.S. Application Data

(63) Continuation of application No. PCT/JP2020/024016, filed on Jun. 18, 2020.

(30) Foreign Application Priority Data

Jun. 21, 2019 (JP) .................................. 2019-115689

(51) Int. Cl.
*H04L 45/00* (2022.01)
*H04L 43/04* (2022.01)
(Continued)

(52) U.S. Cl.
CPC ............... *H04L 45/70* (2013.01); *H04L 43/04* (2013.01); *H04L 47/20* (2013.01); *H04L 67/63* (2022.05)

(58) Field of Classification Search
CPC ......... H04L 45/70; H04L 43/04; H04L 47/20; H04L 67/63; H04L 45/125;
(Continued)

(56) References Cited

U.S. PATENT DOCUMENTS

| | | | |
|---|---|---|---|
| 5,970,477 A | 10/1999 | Roden | |
| 6,968,389 B1 | 11/2005 | Menditto et al. | |

(Continued)

FOREIGN PATENT DOCUMENTS

| | | | |
|---|---|---|---|
| CN | 1679359 A | 10/2005 | |
| CN | 101610174 A | 12/2009 | |

(Continued)

OTHER PUBLICATIONS

U.S. Appl. No. 17/555,184, filed Dec. 17, 2021, Routing Destination Evaluation Apparatus, Routing Destination Evaluating Method and Program.

(Continued)

*Primary Examiner* — Charles C Jiang
*Assistant Examiner* — Shawn D Miller
(74) *Attorney, Agent, or Firm* — Knobbe, Martens, Olson & Bear, LLP

(57) ABSTRACT

A policy determination apparatus includes an acquisition unit, a metrics generation unit, an evaluation unit, and a policy determination unit. The acquisition unit acquires monitoring data relating to states of facilities on a network. The metrics generation unit generates, based on the monitoring data, time-series data of types of metrics associated with candidates of routing destinations to which a routing control apparatus routes requests. The evaluation unit evaluates the candidates based on the time-series data to generate routing destination evaluation data. The policy determination unit determines, based on the routing destination evaluation data, a policy that the routing control apparatus uses for control of the routing destinations.

10 Claims, 9 Drawing Sheets

(51) Int. Cl.
   *H04L 47/20* (2022.01)
   *H04L 67/63* (2022.01)

(58) Field of Classification Search
   CPC . H04L 67/1025; H04L 43/08; H04L 67/1036; H04L 67/12; H04L 67/1023
   See application file for complete search history.

(56) References Cited

U.S. PATENT DOCUMENTS

| | | | |
|---|---|---|---|
| 10,055,262 | B1 | 8/2018 | Thomas |
| 10,261,834 | B2 | 4/2019 | Mecklin et al. |
| 2003/0065762 | A1 | 4/2003 | Stolorz et al. |
| 2004/0022224 | A1 | 2/2004 | Billhartz |
| 2005/0033858 | A1 | 2/2005 | Swildens et al. |
| 2006/0294219 | A1 | 12/2006 | Ogawa et al. |
| 2007/0263650 | A1 | 11/2007 | Subramania et al. |
| 2008/0215718 | A1 | 9/2008 | Stolorz et al. |
| 2009/0150565 | A1* | 6/2009 | Grossner ............ H04L 67/56 709/241 |
| 2011/0264798 | A1 | 10/2011 | Joshi |
| 2011/0283016 | A1 | 11/2011 | Uchida |
| 2011/0289214 | A1 | 11/2011 | Freedman |
| 2015/0281339 | A1 | 10/2015 | Strassner |
| 2015/0312325 | A1 | 10/2015 | Lowekamp et al. |
| 2015/0365328 | A1 | 12/2015 | Luke et al. |
| 2016/0337426 | A1 | 11/2016 | Shribman et al. |
| 2017/0019335 | A1 | 1/2017 | Schultz et al. |
| 2017/0126789 | A1* | 5/2017 | Kondapalli ......... H04L 41/0672 |
| 2017/0230260 | A1 | 8/2017 | Gueta et al. |
| 2018/0191622 | A1 | 7/2018 | Karthikeyan et al. |
| 2018/0278498 | A1 | 9/2018 | Zeng et al. |
| 2019/0104069 | A1 | 4/2019 | Kommula et al. |
| 2020/0014486 | A1 | 1/2020 | Harrang et al. |
| 2020/0177502 | A1* | 6/2020 | Lucas ................. H04L 67/63 |
| 2020/0195673 | A1 | 6/2020 | Lee |
| 2020/0314208 | A1 | 10/2020 | Meenan et al. |
| 2022/0109609 | A1 | 4/2022 | Ono et al. |
| 2022/0116316 | A1 | 4/2022 | Kisa et al. |
| 2022/0116328 | A1 | 4/2022 | Tamura et al. |

FOREIGN PATENT DOCUMENTS

| | | |
|---|---|---|
| EP | 1529406 B1 | 5/2012 |
| GB | 2539994 A | 1/2017 |
| JP | 2005-537687 A | 12/2005 |
| JP | 2009-181152 A | 8/2009 |
| JP | 2011-170422 A | 9/2011 |
| JP | 2012-159873 A | 8/2012 |
| JP | 2015-231134 A | 12/2015 |
| WO | WO 2005/034446 A1 | 4/2005 |
| WO | WO 2009/072094 A2 | 6/2009 |
| WO | WO 2017/037768 A1 | 3/2017 |
| WO | WO 2017/119950 A1 | 7/2017 |
| WO | WO 2020/256074 A1 | 12/2020 |
| WO | WO 2020/256075 A1 | 12/2020 |
| WO | WO 2020/256076 A1 | 12/2020 |
| WO | WO 2020/256077 A1 | 12/2020 |

OTHER PUBLICATIONS

U.S. Appl. No. 17/555,271, filed Dec. 17, 2021, Policy Determination Apparatus, Policy Determining Method and Program.
U.S. Appl. No. 17/555,232, filed Dec. 17, 2021, Policy Determination Apparatus, Policy Determining Method and Program.
Cloud Native SDx Control Technology; Apr. 2018, [retrieval date Aug. 14, 2020]. https://www.ntt.co.jp/journal/1804/files/JN20180450.pdf (Japanese), https://www.ntt-review.jp/archive/ntttechnical.php?contents=ntr201807ral.pdf&mode=show_pdf (English), section "Cloud native SDx control technology", fig. 1, (Hirota, Takeshi et al., "Cloud native SDx control technology", NTT Technical Journal [online]).
Laquerre, Peter et al. Oracle Cloud Infrastructure Load Balancing Classic; Nov. 2018, [retrieval date Aug. 14, 2020], Internet: https://docs.oracle.com/cd/E83857_01/iaas/load-balancer.cloud/1brug/index.html, in particular section, section "Creating a load balancer policy", non-official translation ("Using Oracle Cloud Infrastructure Load Balancing Classic E76938-08 [online]").
PCT International Search Report of PCT Application No. PCT/JP2020/024016 dated Aug. 25, 2020, 6 pages.
Yasukawa, Seisho et al., "Research toward Realizing a Future Network Architecture", NTT Gijutu Journal (NTT Technical Review), Mar. 2018, pp. 23-30.
PCT International Search Report and Written Opinion for International Application No. PCT/JP2020/024016 dated Aug. 25, 2020, 16 pages.
PCT International Preliminary Report on Patentability for International Application No. PCT/JP2020/024016 dated Dec. 30, 2021, 13 pages.
PCT International Search Report and Written Opinion for International Application No. PCT/JP2020/024017 dated Aug. 25, 2020, 14 pages.
PCT International Preliminary Report on Patentability for International Application No. PCT/JP2020/024017 dated Dec. 30, 2021, 11 pages.
PCT International Search Report and Written Opinion for International Application No. PCT/JP2020/024018, dated Sep. 1, 2020, 11 pages.
PCT International Preliminary Report on Patentability for International Application No. PCT/JP2020/024018, dated Dec. 30, 2021, 9 pages.
PCT International Search Report and Written Opinion for International Application No. PCT/JP2020/024015, dated Aug. 25, 2020, in 14 pages.
PCT International Preliminary Report on Patentability for International Application No. PCT/JP2020/024015, dated Dec. 30, 2021, in 11 pages.
Extended Search Report for EP Application No. 20827422.5 dated Jul. 8, 2022, 10 pages.
Extended Search Report for EP Application No. 20827498.5 dated Jul. 8, 2022, 12 pages.
Extended Search Report for EP Application No. 20826374.9 dated Jun. 21, 2022, 11 pages.
Extended Search Report for EP Application No. 20825665.1 dated May 9, 2023, 9 pages.
Japanese Office Action for JP Application No. 2019-115693 dated Jun. 6, 2023, 7 pages.
Chinese Office Action for CN Application No. CN 202080045536.9 dated Nov. 23, 2023, 18 pages.

* cited by examiner

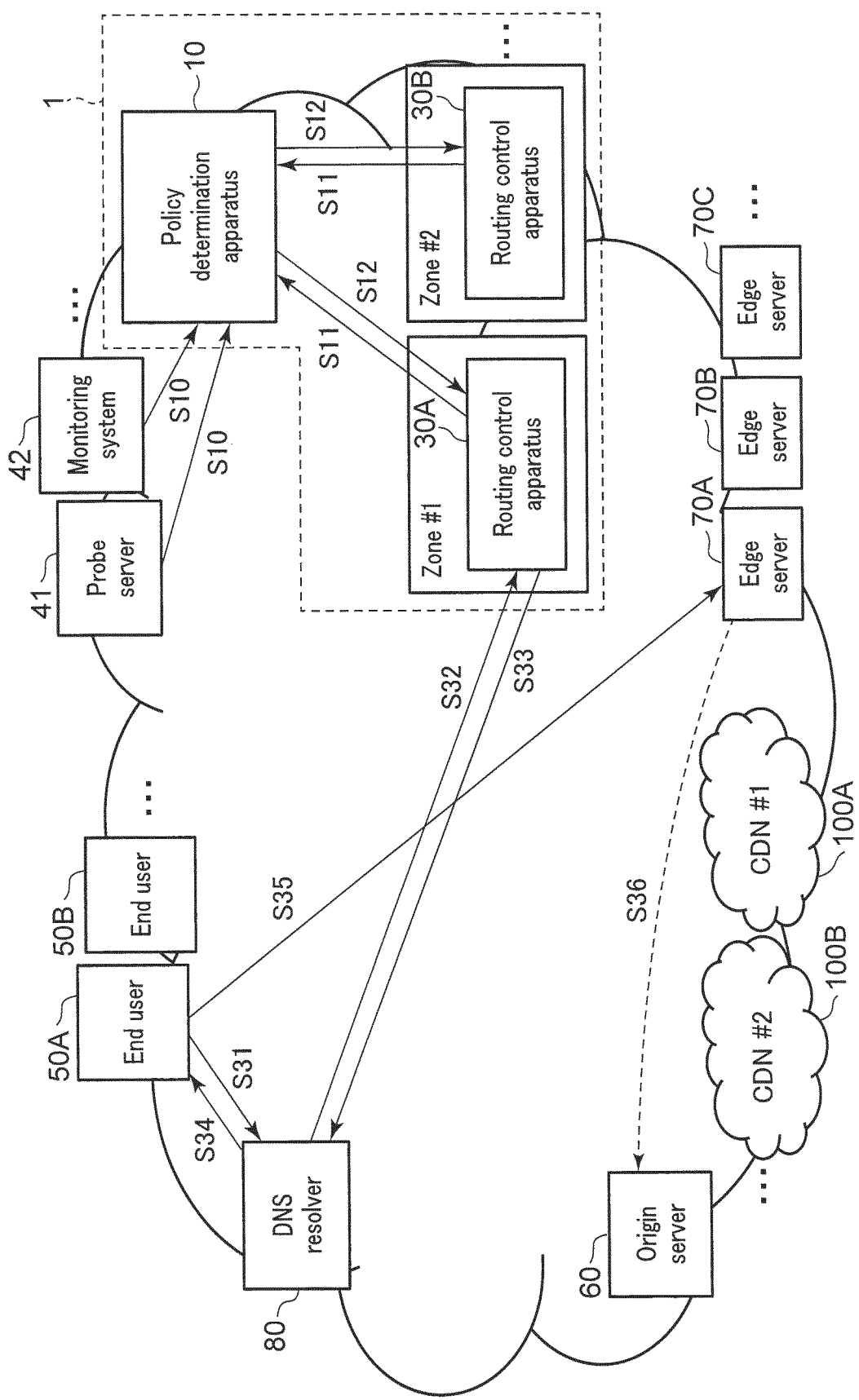
F I G. 1A

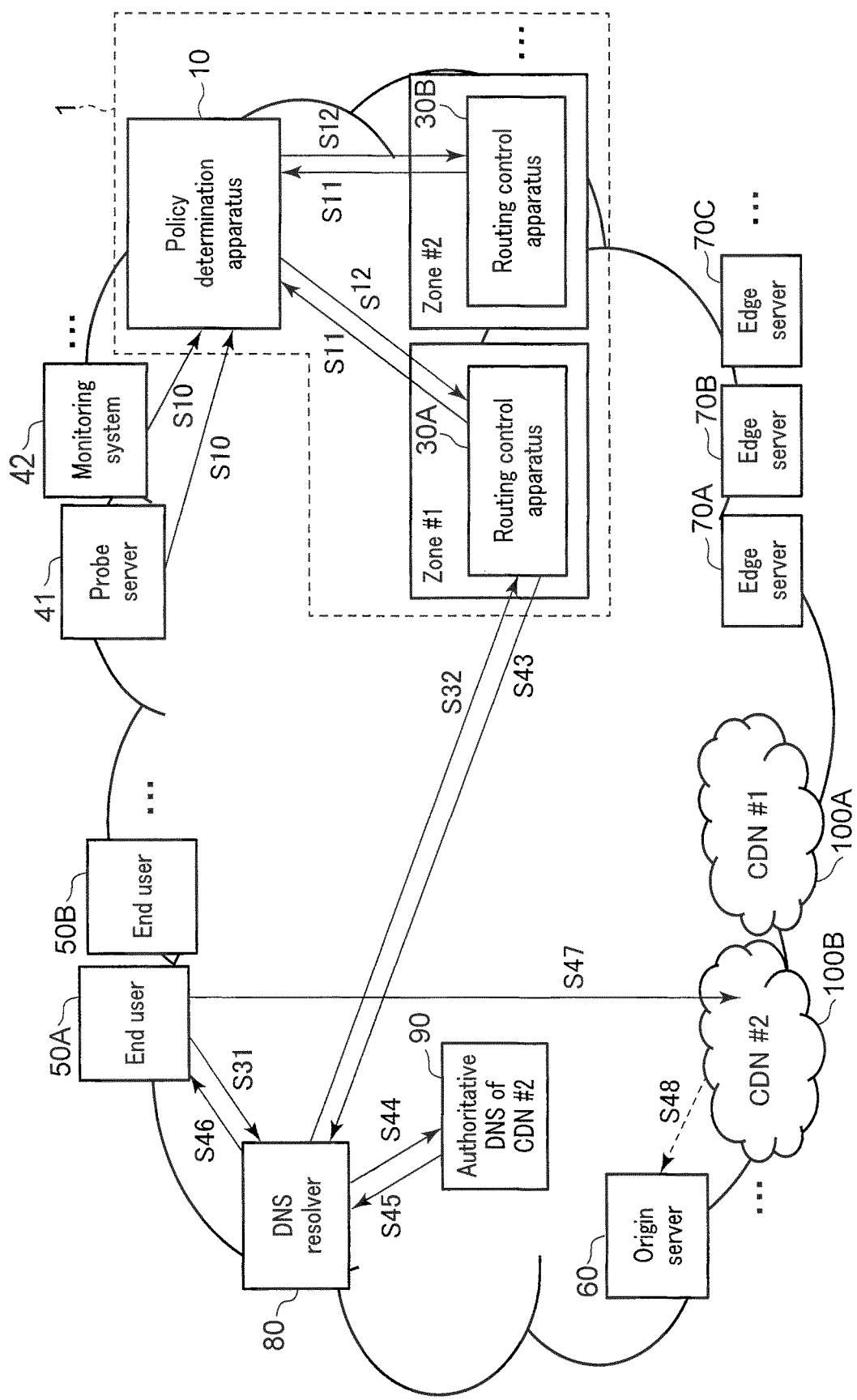
F I G. 1B

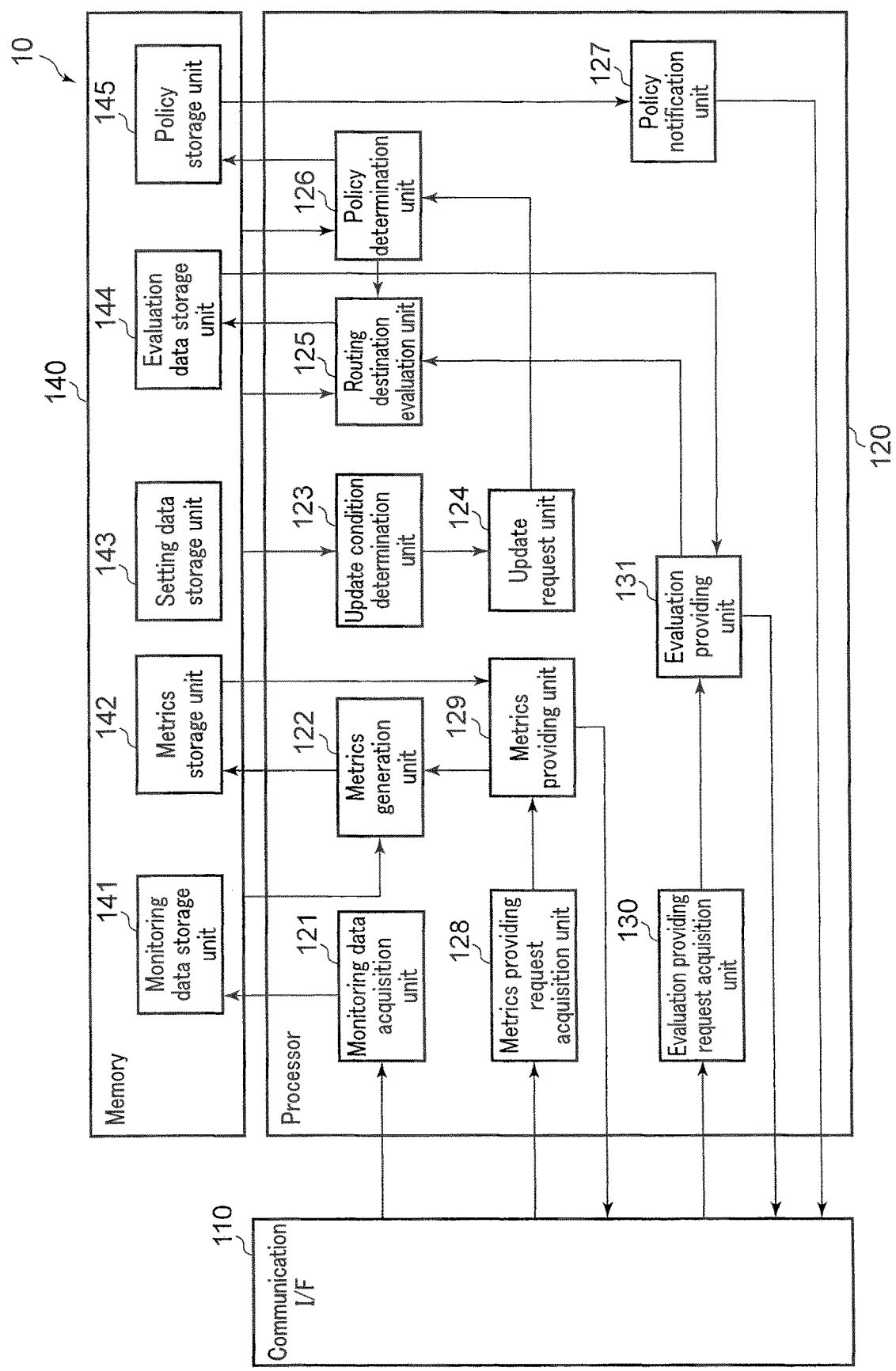
F I G. 2

|  | Availability | RTT | Cost |
|---|---|---|---|
| Edge 1 | ○ | 100 | ¥500 |
| Edge 2 | × | — | ¥500 |
| Edge 3 | ○ | 200 | ¥300 |
| Edge 4 | × | — | ¥200 |
| Edge 5 | ○ | 240 | ¥400 |
| Edge 6 | ○ | 160 | ¥500 |
| Edge 7 | ○ | 160 | ¥300 |
| ⋮ | ⋮ | ⋮ | ⋮ |

FIG. 6

|  | RTT | RTT score | Cost | Cost score |
|---|---|---|---|---|
| Edge 1 | 100 | 0--------0.8-1 | ¥500 | 0----0.4-------1 |
| Edge 2 | — | 0.0------------1 | ¥500 | 0----0.4-------1 |
| Edge 3 | 200 | 0-----0.5-----1 | ¥300 | 0------0.6---1 |
| Edge 4 | — | 0.0-----------1 | ¥200 | 0-------0.7--1 |
| Edge 5 | 240 | 0----0.4------1 | ¥400 | 0-------0.5----1 |
| Edge 6 | 160 | 0-------0.6---1 | ¥500 | 0----0.4-------1 |
| Edge 7 | 160 | 0-------0.6---1 | ¥300 | 0------0.6---1 |
| ⋮ | ⋮ | ⋮ | ⋮ | ⋮ |

FIG. 7

|  |  | Standard | Arbitrary |
|---|---|---|---|
| Priority | RTT | 80 | 30 |
|  | Cost | 20 | 70 |
| Number k of edges |  | 2 | 1 |

FIG. 8

|  |  | Edge score |
|---|---|---|
| Edge 1 | 80 × 0.8 + 20 × 0.4 | 72 |
| Edge 2 | 80 × 0.0 + 20 × 0.4 | 8 |
| Edge 3 | 80 × 0.5 + 20 × 0.6 | 52 |
| Edge 4 | 80 × 0.0 + 20 × 0.7 | 14 |
| Edge 5 | 80 × 0.4 + 20 × 0.5 | 42 |
| Edge 6 | 80 × 0.6 + 20 × 0.4 | 56 |
| Edge 7 | 80 × 0.6 + 20 × 0.6 | 60 |
| ⋮ | ⋮ | ⋮ |

F I G. 9

| Edge ranking | Edge score |  | Weight |
|---|---|---|---|
| Edge 1 | 72 | 72/(72+60) | 55% |
| Edge 7 | 60 | 60/(72+60) | 45% |

F I G. 10

POLICY DETERMINATION APPARATUS, POLICY DETERMINING METHOD AND PROGRAM

CROSS-REFERENCE TO RELATED APPLICATIONS

This application is a Continuation Application of PCT Application No. PCT/JP2020/024016, filed Jun. 18, 2020 and based upon and claiming the benefit of priority from Japanese Patent Application No. 2019-115689, filed Jun. 21, 2019, the entire contents of all of which are incorporated herein by reference.

FIELD

One aspect of the present invention relates to load distribution on a network.

BACKGROUND

In accordance with the recent development of Internet of Things (IoT) and mobile communication technologies, the volume of data transmitted through the Internet and other networks has been exponentially increasing. For this reason, further developed techniques for network load distribution and traffic control are being sought after.

In a network system, by not forwarding Hypertext Transfer Protocol (HTTP) requests to a single server such as the origin server of a content delivery network (CDN), but rather distributing them to this server and other substitute servers, the expandability and availability of the system can be enhanced. The load distribution technique can be roughly divided into a static distribution scheme and a dynamic distribution scheme: with the former scheme, each request is routed to any one of servers in accordance with a predetermined policy such as round robin and weighted round robin, whereas with the latter scheme, each request is routed to an optimal one of servers while monitoring the states of the servers, such as the number of connections, the number of clients, the volume of data communication, response time, loads on the servers, and the like.

In recent years, the load distribution technique has been applied to the edge computing technique, CDN technique, and the like. Non-patent literature 1 indicates that the CDN technique is now under consideration in order to realize high-quality distributions in an economical manner for next-generation high-definition high-presence video contents, as typified by 4K/8K and AR/VR.

CITATION LIST

Non Patent Literature

[NON PATENT LITERATURE 1] Seisho Yasukawa et al., "Research toward Realizing a Future Network Architecture", NTT Gijutu Journal, March 2018, pages 23 to 30.

SUMMARY

Technical Problem

With the aforementioned static distribution scheme, the load distribution can be realized with a simply policy, but if a change occurs in the states of routing destination candidates, the efficiency may be lowered. In contrast, with the aforementioned dynamic distribution scheme, the load distributing efficiency is not easily lowered even if there is a change in the states of the routing destination candidates. However, a load balancer is required in order to monitor the states of the routing destination candidates in real time and select a routing destination.

The purpose of the present invention is to dynamically determine a policy to be used for controlling the request routing.

Solution to Problem

A policy determination apparatus according to first aspect of the present invention includes a monitoring data acquisition unit, a metrics generation unit, a routing destination evaluation unit, a policy determination unit, and a policy notification unit. The monitoring data acquisition unit is configured to acquire monitoring data relating to states of facilities on a network, the monitoring data being received from an external device. The metrics generation unit is configured to generate, based on the monitoring data, time-series data of a plurality of types of metrics associated with each of a plurality of candidates of routing destinations to which a routing control apparatus routes requests including first destination data. The routing destination evaluation unit is configured to evaluate the candidates based on the time-series data of the types of metrics associated with the candidates to generate routing destination evaluation data. The policy determination unit is configured to determine, based on the routing destination evaluation data, a policy that the routing control apparatus uses for control of the routing destinations. The policy notification unit is configured to notify the routing control apparatus of the policy. Accordingly, the policy to be used for controlling the request routing destinations can be dynamically determined.

In the policy determination apparatus according to the first aspect, the routing destination evaluation unit may be configured to evaluate the candidates based on the time-series data of the types of metrics associated with the candidates and priorities assigned to the types of metrics. With this policy determination apparatus (hereinafter referred to as a "policy determination apparatus according to the second aspect of the present invention"), the candidates can be evaluated with priorities assigned to the metrics, in addition to the values of the metrics themselves, taken into consideration.

In the policy determination apparatus according to the second aspect, the routing destination evaluation unit may be configured to calculate, for each of the candidates, an evaluation value of the candidate by adding values weighted in accordance with the priorities, the values being based on the time-series data of the types of metrics corresponding to the candidate. With this policy determination apparatus (hereinafter referred to as a "policy determination apparatus according to the third aspect of the present invention"), the influence of each value of the metrics on the evaluation can be adjusted by way of priorities assigned to the metrics.

In the policy determination apparatus according to the first to third aspects, the routing destination evaluation data may include evaluation values of the candidates, and the policy determination unit may be configured to determine the policy such that the routing control apparatus routes the requests to the candidates in proportions being based on the evaluation values. With this policy determination apparatus (hereinafter referred to as a "policy determination apparatus according to the fourth aspect of the present invention"), the proportion of each candidate to which requests are routed can be determined in association with the evaluation value of the candidate.

The policy determination apparatus according to the first to fourth aspects may further include an update condition determination unit configured to determine whether or not a predetermined policy update condition is satisfied, and an update request unit configured to issue a policy update request when the policy update condition is determined to be satisfied, the policy determination unit may be configured to re-determine the policy in response to the policy update request, and the policy notification unit may be configured to notify the routing control apparatus of the re-determined policy. With this policy determination apparatus (hereinafter referred to as the "policy determination apparatus according to the fifth aspect"), the policy can be re-determined every time the policy update condition is satisfied.

In the policy determination apparatus according to the first to fifth aspects, the types of metrics associated with a first candidate included in the candidates may include first metrics relating to a transmission cost of a request when the first candidate is selected as a routing destination, and second metrics relating to a transmission quality of the request when the first candidate is selected as the routing destination. With this policy determination apparatus (hereinafter referred to as the "policy determination apparatus according to the sixth aspect"), the policy can be determined based on the routing destination evaluation data of the evaluation from multiple points of view, including a transmission cost and transmission quality.

The policy determination apparatus according to the first to sixth aspects may further include a metrics providing request acquisition unit configured to acquire a metrics providing request for requesting at least a portion of time-series data of the types of metrics associated with at least one of the candidates, and a metrics providing unit configured to provide a source of the metrics providing request with data targeted by the metrics providing request. With this policy determination apparatus (hereinafter referred to as a "policy determination apparatus according to the seventh aspect of the present invention"), the metrics data can be provided to external devices.

The policy determination apparatus according to the first to seventh aspects may further include an evaluation providing request acquisition unit configured to acquire an evaluation providing request targeted for at least one of the candidates, and an evaluation providing unit configured to provide a source of the evaluation providing request with routing destination evaluation data of the candidate that the evaluation providing request is targeted for. Accordingly, the routing destination evaluation data can be provided to external devices.

A policy determining method according to the eighth aspect of the present invention includes acquiring monitoring data relating to states of facilities on a network, the monitoring data being received from an external device, generating, based on the monitoring data, time-series data of a plurality of types of metrics associated with each of a plurality of candidates of routing destinations to which a routing control apparatus routes requests including first destination data, evaluating the candidates based on the time-series data of the types of metrics associated with the candidates to generate routing destination evaluation data, determining, based on the routing destination evaluation data, a policy that the routing control apparatus uses for control of the routing destinations, and notifying the routing control apparatus of the policy. Accordingly, the policy to be used for controlling the request routing destinations can be dynamically determined.

A policy determining program according to the ninth aspect of the present invention causes a computer to function as means for acquiring monitoring data relating to states of facilities on a network, the monitoring data being received from an external device, means for generating, based on the monitoring data, time-series data of a plurality of types of metrics associated with each of a plurality of candidates of routing destinations to which a routing control apparatus routes requests including first destination data, means for evaluating the candidates based on the time-series data of the types of metrics associated with the candidates to generate routing destination evaluation data, means for determining, based on the routing destination evaluation data, a policy that the routing control apparatus uses for control of the routing destinations, and means for notifying the routing control apparatus of the policy. Accordingly, the policy to be used for controlling the request routing destinations can be dynamically determined.

Advantageous Effects of Invention

According to the present invention, the policy to be used for controlling the request routing can be dynamically determined.

BRIEF DESCRIPTION OF THE DRAWINGS

FIG. 1A is a diagram showing an exemplary load distribution system including a policy determination apparatus according to the present embodiment.

FIG. 1B is a diagram showing another exemplary load distribution system including a policy determination apparatus according to the present embodiment.

FIG. 2 is a block diagram showing an exemplary policy determination apparatus according to the present embodiment.

FIG. 6 is a diagram showing an exemplary storage content in a monitoring data storage unit illustrated in FIG. 2.

FIG. 7 is a diagram showing an exemplary storage content in a metrics storage unit illustrated in FIG. 2.

FIG. 8 is a diagram showing an exemplary storage content in a setting data storage unit illustrated in FIG. 2.

FIG. 9 is a diagram explaining the operation of a routing destination evaluation unit illustrated in FIG. 2.

FIG. 10 is a diagram explaining the operation of a policy determination unit illustrated in FIG. 2.

DETAILED DESCRIPTION

Figure 1C:
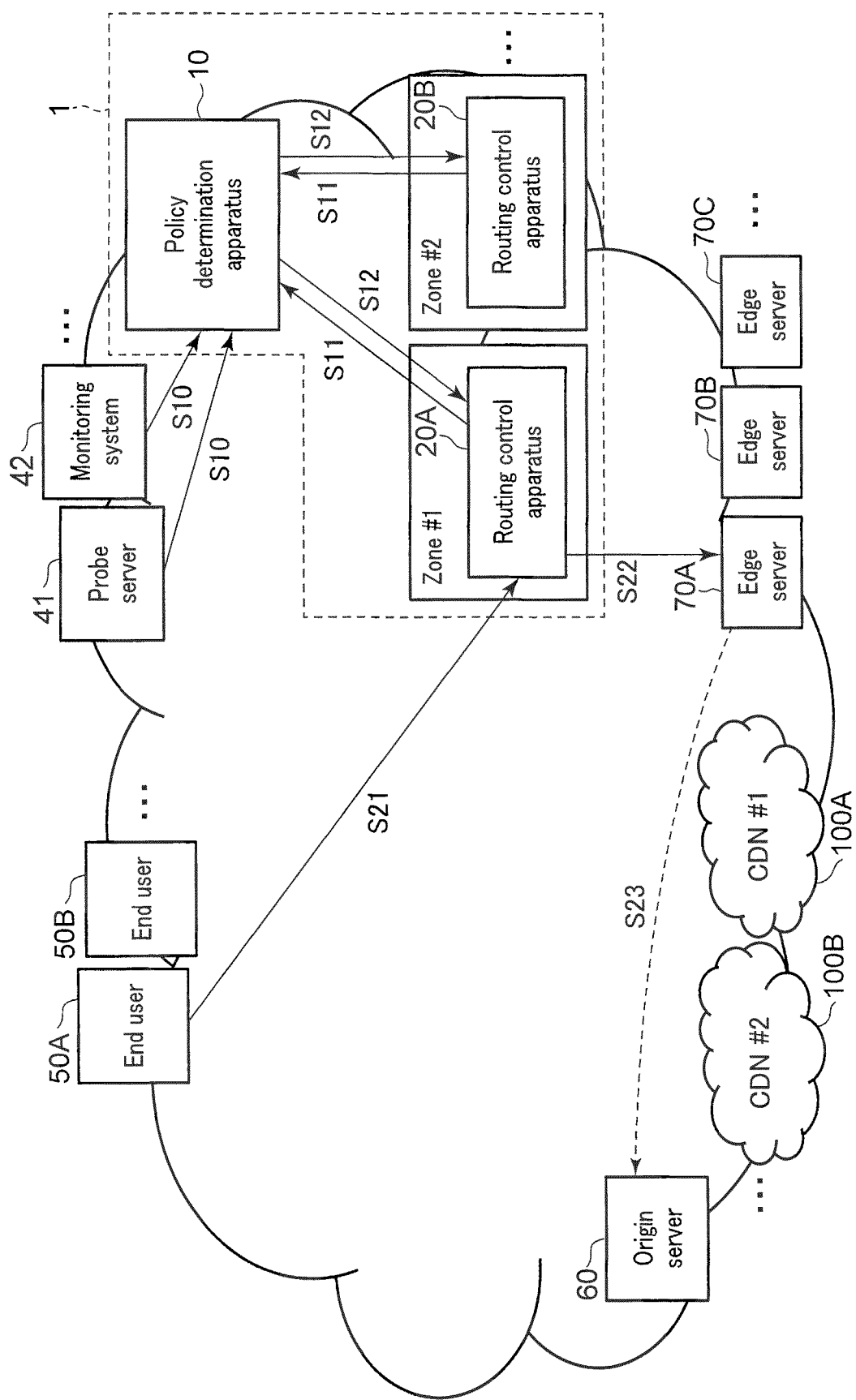
FIG. 1C is a diagram showing another exemplary load distribution system including a policy determination apparatus according to the present embodiment.

Embodiments of the present invention will be described below with reference to the drawings. Components that are the same as or similar to already explained components are provided with the same or similar reference signs, and overlapping explanations will essentially be omitted.

In order to facilitate the understanding of the policy determination apparatus according to the present embodiment, working examples of the policy determination apparatus will first be explained.

Applied Examples (1) Configuration

FIG. 1A is a diagram showing the first example of the overall configuration of a load distribution system including a policy determination apparatus according to the present embodiment and the processing flow of the system.

A routing control system 1 including the policy determination apparatus according to the present embodiment is provided, for example on a web or a cloud, and is connected in a communicable manner through a data transmission network to probe servers 41, monitoring systems 42, end users 50A, 50B, . . . (hereinafter also collectively referred to as "end users 50"), edge servers 70A, 70B, 70C, . . . (hereinafter also collectively referred to as "edge servers 70"), CDNs 100A, 100B, . . . (hereinafter also collectively referred to as "CDNs 100"), and an origin server 60.

The data transmission network includes, for example, a relay network, and a plurality of access networks for accessing this relay network. As a relay network, a commonly employed public network such as the Internet, or a closed network that is controlled in a manner such that only limited devices can have access, may be adopted. As an access network, a wireless local area network (LAN), cellular network, wired telephone network, Fiber to the Home (FTTH) network, cable television (CATV) network, and the like may be adopted. In the following description, the Internet will be discussed as a data transmission network for the sake of simplicity.

The probe server 41 and/or monitoring system 42 may be a server computer or a personal computer. The probe server 41 and/or monitoring system 42 continuously collects and monitors the states of network facilities such as the origin server 60, edge servers 70, and/or CDNs 100, including log information such as an operation log and security log, and load information such as usage of servers and memories. The probe server 41 and/or monitoring system 42 generate the monitoring data and transmit the data to the policy determination apparatus 10. Any number of probe servers 41 and/or monitoring systems 42 can be connected to the policy determination apparatus 10 through the network.

Examples of end users 50 include information processing terminals of users such as personal computers and smart phones, vehicles capable of establishing a connection to a network to transmit and receive information, and IoT devices capable of collecting measurement results from various kinds of sensors and transmitting the results. Access requests from the end users 50 therefore include those for downloading data such as video and other contents and software updating programs, and for uploading data such as IoT data. Any number of end users 50 can be connected to a routing control apparatus 30 in the routing control system 1 through the network.

The edge server 70 is implemented by a server computer that has an arbitrary storage capacity and that is capable of caching data. The CDN 100A, which serves as an edge network, may be operated by a first CDN business operator. The CDN 100B and the like may be operated by CDN business operators different from the first CDN business operator. The CDNs 100 are not illustrated as revealing the information on the edge servers therein to the routing control system 1. Some of the CDNs 100, however, may be configured to reveal the information on the edge servers therein to the routing control system 1. In this case, the routing control system 1 may handle the CDN 100 as a routing destination candidate, or the edge servers in the CDN 100 as routing destination candidates.

In the following description, the CDN 100A, CDN 100B, and the like, and edge servers 70 accessible from the routing control system 1, may be simply referred to as "edges", which serve as routing destination candidates, or may be collectively referred to as a group of edges. A group of edges may also include cloud computing services provided by service providers, CDNs that partially reveal the interior information, and the like, which are not illustrated. Any number of edges may be connected to the end users 50 through the network.

The origin server 60 is a data server that is operated and managed by a content distributor and holds contents to be distributed to the end users 50 (allowing the end users 50 to download the data), or a data server that is operated and managed by a business operator, which collects the IoT data, and collects data from the end users 50 (allowing the end users 50 to upload the data), such as a web server or a file server. The drawing shows only one origin server 60, but any number of origin servers 60 can be included.

With regard to access requests from the end users 50, the routing control system 1 selects a suitable routing destination from the group of edges including the CDNs 100 or edge servers 70, and routes the requests. In particular, the policy determination apparatus 10 in the routing control system 1 determines a policy to be used for controlling the routing destinations to which the requests are routed, and the routing control apparatus 30 in the routing control system 1 routes the requests in accordance with this policy. The policy here may indicate a plurality of request routing destination candidates and proportions in which the requests are routed to the candidates. The routing control apparatus 30 may use these proportions as weights for the weighted round robin when sorting the requests.

The routing control system 1 includes the policy determination apparatus 10, and the routing control apparatuses 30A, 30B, . . . (hereinafter collectively referred to as the "routing control apparatuses 30"). The routing control system 1 may include any number of routing control apparatuses 20.

The policy determination apparatus 10 may be a server computer or a personal computer, and is configured to collect monitoring data from the probe server 41 and/or monitoring system 42 and determine (generate or update) a policy based on items of metrics derived or calculated from the monitoring data.

A metric is an indicator used for evaluation of selectable candidates as request routing destinations, the indicator indicating the state of each candidate. The metrics may be a value as-is contained in the monitoring data, or a manipulated value or statistical value of the contained value.

The policy determination apparatus 10 may be further configured to determine a policy based on a request from a customer who is a service provider using the origin server 60. For instance, the policy determination apparatus 10 may evaluate the routing destination candidates by considering the metrics of the routing destination candidates with reference to the standards corresponding to the priorities designated by a customer device, and thereby determine the policy. Alternatively, the policy determination apparatus 10 may determine the policy in such a manner that the requests are routed to the candidates in proportions based on the weights set by the customer device.

The customer device here indicates a device authorized to set weights for determining a policy to be applied to the requests including destination data and made to the origin server 60, and/or priorities to be assigned to the metrics relating to the evaluation for determining this policy. For instance, in accordance with an operation performed by the operator of the origin server 60, terminals connected to the intra-office network or to a public network make access to the web site (portal site) for establishing the setting. These terminals are authorized by passing any authentication such as password authentication, and thereby serve as customer devices during the authorization period. The customer devices are allowed to browse evaluation data (e.g., ranking data) of the routing destination candidates and to set the weights and/or priorities.

As described above, the policy determination apparatus 10 serves as a brain of the routing control system 1, designating a policy that indicates how the routing control apparatus 30 should select a routing destination.

On the other hand, the routing control apparatuses 30 implement a routing control process to actualize the routing control system 1, in accordance with the policy determined by the centrally situated policy determination apparatus 10. The routing control apparatus 30 may correspond to an L4 load balancer (also referred to as a DNS load balancer). The routing control apparatuses 30A, 30B, . . . are assigned respectively to the first zone #1, second zone #2, . . . , respectively. A zone is defined for each routing control apparatus 30 so that the routing control apparatus 30 can route the requests to the Point of Presence (PoP) belonging to the corresponding zone. The PoP denotes the base of routing destinations having an access point to an external network.

(2) Operations

Next, the information processing operation of the load distribution system including the routing control system 1 will be explained.

(2-1) Policy Determination (S10 to S12)

First, the policy determination processing will be explained with reference to FIG. 1A.

According to the embodiment, first, at step S10, the policy determination apparatus 10 continuously collects monitoring data from the probe server 41 and/or monitoring system 42, and thereby monitors the usage and performance of the network facilities. Alternatively, the policy determination apparatus 10 may directly collect information that indicates the loads of the CDNs 100 or edge servers 70, or may collect it by way of the routing control apparatus 30.

On the other hand, the policy determination apparatus 10 receives a policy update (or generation) request from a routing control apparatus 30 (step S11). This request may be output from the routing control apparatus 30 at regular intervals, or a change to the configuration of the edges relating to zones may trigger the request to be output from the routing control apparatus 30. Together with a policy update request, the routing control apparatus 30 may transmit to the policy determination apparatus 10 the acquired information relating to the CDNs 100, edge servers 70, or origin server 60.

Next, at step S12, the policy determination apparatus 10 determines a policy based on the monitoring data collected previously at step S10, and thereafter performs an operation of returning the latest policy to the routing control apparatus 30. That is, the policy determination apparatus 10 is configured to derive or calculate multiple types of metrics from the collected monitoring data, and generate or update a policy based on the calculated metrics.

For instance, the monitoring data collected by the policy determination apparatus 10 may include, as dynamic data, an operation log and monitoring results of the states of networks, and, as static data, preference conditions set by a customer, contract descriptions, contract fees for each CDN, and the like. The policy determination apparatus 10 may acquire the schedule for distributing the data held by the origin server 60, and, based on the acquired distribution schedule, may determine a policy designating a specific edge to be selected on a priority basis for a time slot in which specific data is distributed. Alternatively, the policy determination apparatus 10 may acquire priorities (preference standards) of the metrics and/or weights (proportions of routing) of the edges, and evaluate the routing destination candidates in accordance with the priorities and/or the weights. The policy may be individually determined for origin servers 60, or commonly determined for multiple origin servers. The routing control apparatuses 30 store the latest policy received at step S12 in a not-shown storage unit.

Instead of using a policy update request from the routing control apparatus 30 at step S11 as a trigger as indicated above, the policy determination apparatus 10 may be configured to regularly determine a policy for the routing control apparatuses 30 and report it to the routing control apparatuses 30. That is, the policy determination apparatus 10 may regularly derive or calculate multiple types of metrics from the collected monitoring data, and generate or update the policy based on the calculated metrics.

(2-2) Routing Control by DNS-Based Routing Control Apparatus

Next, as a first example of routing control, the procedure and details of the request routing control performed by a DNS-based routing control apparatus 30 will be explained with reference to FIG. 1A.

(2-2-1) Routing Control Example 1-1 (S31 to S36)

When the end user 50A is trying to access the origin server (data server) 60 to request distribution of a content in FIG. 1A, the routing control according to Example 1 will be performed as indicated below.

First, at step S31, the end user 50A sends an inquiry, as an access request, to the DNS resolver 80 designated by the end user 50A about a destination IP address for accessing the origin server 60 (e.g., origin.example.com) for name resolution. The DNS resolver 80 may be a specifically designed server, or may be a program to be implemented by the end user 50A.

Next, at step S32, the DNS resolver 80 that has received the inquiry from the end user 50A sends an inquiry to the routing control apparatus 30A, which is an authoritative DNS server holding the information of origin.example.com. Upon receipt of the inquiry, the routing control apparatus 30A acquires information included in this inquiry as address information, and stores the information in the not-shown storage unit. The routing control apparatus 30A, which has received the inquiry about the information of origin.example.com from the DNS resolver 80, further reads out the address information stored in this storage unit, and designates the edge server 70A as a routing destination in accordance with the policy generated by the policy determination apparatus 10.

At step S33, the routing control apparatus 30A sends a response regarding the routing destination information to the DNS resolver 80. Here, the routing destination information transmitted from the routing control apparatus 30A to the DNS resolver 80 at step S33 includes the IP address of the edge server 70A.

Next, at step S34, the DNS resolver 80 sends a response to the end user 50A regarding the routing destination information received from the routing control apparatus 30A.

At step S35, the end user 50A begins to access the edge server 70A, which is the designated routing destination. If the edge server 70A holds the cache of the content requested by the end user 50A, the process is terminated.

If the edge server 70A does not hold the cache of the content requested by the end user 50A, the edge server 70A accesses the origin server 60 at step S36 to acquire the content from the origin server 60.

In this manner, the routing destination designated by the routing control apparatus 30A is allowed to deliver the content held by the origin server 60 to the end user 50A.

(2-2-2) Routing Control Example 1-2 (S31 to S48)

FIG. 1B is a diagram showing the second example of the overall configuration of the load distribution system including the policy determination apparatus 10 according to the present embodiment and the processing flow of the system. In particular, FIG. 1B shows a flow of a process in which, when the end user 50A is trying to access the origin server 60 to request distribution of a content, the routing control apparatus 30A selects the CDN 100 as a routing destination instead of an edge server 70. Steps S10 to S12 and S31 in FIG. 1B are the same as steps S10 to S12 and S31 in FIG. 1A, and therefore these steps are omitted from the explanation.

At step S32, which follows step S31, the DNS resolver 80 that has received an inquiry from the end user 50A sends an inquiry to the routing control apparatus 30A, which is an authoritative DNS server holding the information of origin.example.com. Upon receipt of the inquiry, the routing control apparatus 30A acquires information included in this inquiry as address information, and stores the information in the not-shown storage unit. The routing control apparatus 30A, which has received the inquiry about the information of origin.example.com from the DNS resolver 80, further reads out the address information stored in this storage unit, and designates the CDN 100B as a routing destination in accordance with the policy generated by the policy determination apparatus 10.

At step S43, the routing control apparatus 30A sends the routing destination information as a response to the DNS resolver 80. Since the IP address of the cache server in the CDN 100B that is the routing destination is unknown for the routing control apparatus 30, the DNS resolver 80 is introduced to the authoritative DNS server 90 of the CDN 100B at step S43.

At step S44, the DNS resolver 80 sends an inquiry to the authoritative DNS server 90 of the CDN 100B about the IP address corresponding to the domain name of the origin server 60.

At step S45, the authoritative DNS server 90 of the CDN 100B returns information regarding a suitable edge server in the CDN 100B, or in other words the IP address of this edge server, to the DNS resolver 80.

At step S46, the DNS resolver 80 sends, as a response to the end user 50, the routing destination information received from the authoritative DNS server 90 regarding the edge server of the CDN 100B.

At step S47, the end user 50A begins to access the edge server of the CDN 100B designated as a routing destination. If the edge server holds the cache of the content requested by the end user 50A, the process is terminated.

If the edge server of the CDN 100B does not hold the cache of the content requested by the end user 50A, the edge server accesses the origin server 60 and acquires the content from the origin server 60 at step S48.

In this manner, the routing destination designated by the routing control apparatus 30A is allowed to deliver the content held by the origin server 60 to the end user 50A.

At step S33 in FIG. 1A or at step S43 in FIG. 1B, it is possible that the routing control apparatus 30A may provide the DNS resolver 80 with a designation of the origin server 60 as a routing destination, instead of an edge server.

When the end user 50A wishes to upload data to the origin server 60, the end user 50A is also required to send a request to the origin server 60 or a suitable edge server. The above flow is therefore applicable regardless of whether the flow of the targeted data of a request is in a downstream direction or upstream direction.

The routing control system 1 described above with reference to FIGS. 1A and 1B realizes control of the routing destination of requests from end users 50 in a dynamic and intelligent manner. That is, the policy determination apparatus 10 serves as the brain to dynamically determine a policy based on the collected monitoring data. The routing control apparatus 30A arranged in each zone performs the actual operation, selecting a suitable routing destination from a plurality of edge servers in accordance with the policy defined by the policy determination apparatus 10 serving as the brain.

For instance, with respect to the edge servers to which nonzero values are assigned as proportions in accordance with the policy, the routing control apparatus 30 in the routing control system 1 may use these proportional values as weights for the weighted round robin when sorting the requests. The policy determination apparatus 10 in the routing control system 1 may determine different policies for different time frames, for example between daytime and nighttime.

(2-3) Routing Control by HTTP Routing Control Apparatus

Next, as the second example of the routing control, the request routing control performed by an HTTP routing control apparatus 20 will be explained.

(2-3-1) Routing Control Example 2-1 (S21 to S23)

FIG. 1C is a diagram showing the third example of the overall configuration of the load distribution system including the policy determination apparatus 10 according to the present embodiment and the processing flow of the system. In the exemplary processing flow of FIG. 1C, routing control apparatuses 20A, 20B, . . . are adopted as examples of the routing control apparatuses 20. A routing control apparatus 20 may correspond to an L7 load balancer (also referred to as an HTTP load balancer). In particular, FIG. 1C shows a flow of a process in which, when the end user 50A is trying to access the origin server 60 to request distribution of a content, the routing control apparatus 20A designates the edge server 70A as a routing destination. Steps S10 to S12 in FIG. 1C are the same as steps S10 to S12 in FIGS. 1A and 1B, and therefore these steps are omitted from the explanation.

When the end user 50A is trying to access the origin server (data server) 60 to request distribution of a content, the routing control according to Example 2 is performed as indicated below. It is assumed here that the end user 50A is connected to the routing control apparatus 20A of a specific zone #1 with a scheme such as DNS name resolution or anycast.

First, at step S21, the end user 50A sends, as an access request, an HTTP request to the routing control apparatus 20A. The routing control apparatus 20A receives the HTTP request, acquires the address information included in this HTTP request, and stores it in the not-shown storage unit. The routing control apparatus 20A may store the HTTP request itself in the storage unit.

Next, at step S22, the routing control apparatus 20A selects the edge server 70A as a routing destination in accordance with the policy stored in the storage unit, and transfers the HTTP request to the edge server 70A. Here, the routing control apparatus 20A may take into consideration the description of the request included in the HTTP request, the type of target data, information of the end user 50A, and the like, in addition to the policy, when selecting the routing destination. If the edge server 70A holds the cache of the content requested by the end user 50A, the process is terminated.

If the edge server 70A does not hold the cache of the content requested by the end user 50A, the request is further transferred from the edge server 70A to the origin server 60 at step S23.

As a result, the routing destination designated by the routing control apparatus 20A is allowed to deliver the content held by the origin server 60 to the end user 50A.

(2-3-2) Routing Control Example 2-2 (S21 to S53)

Figure 1D:
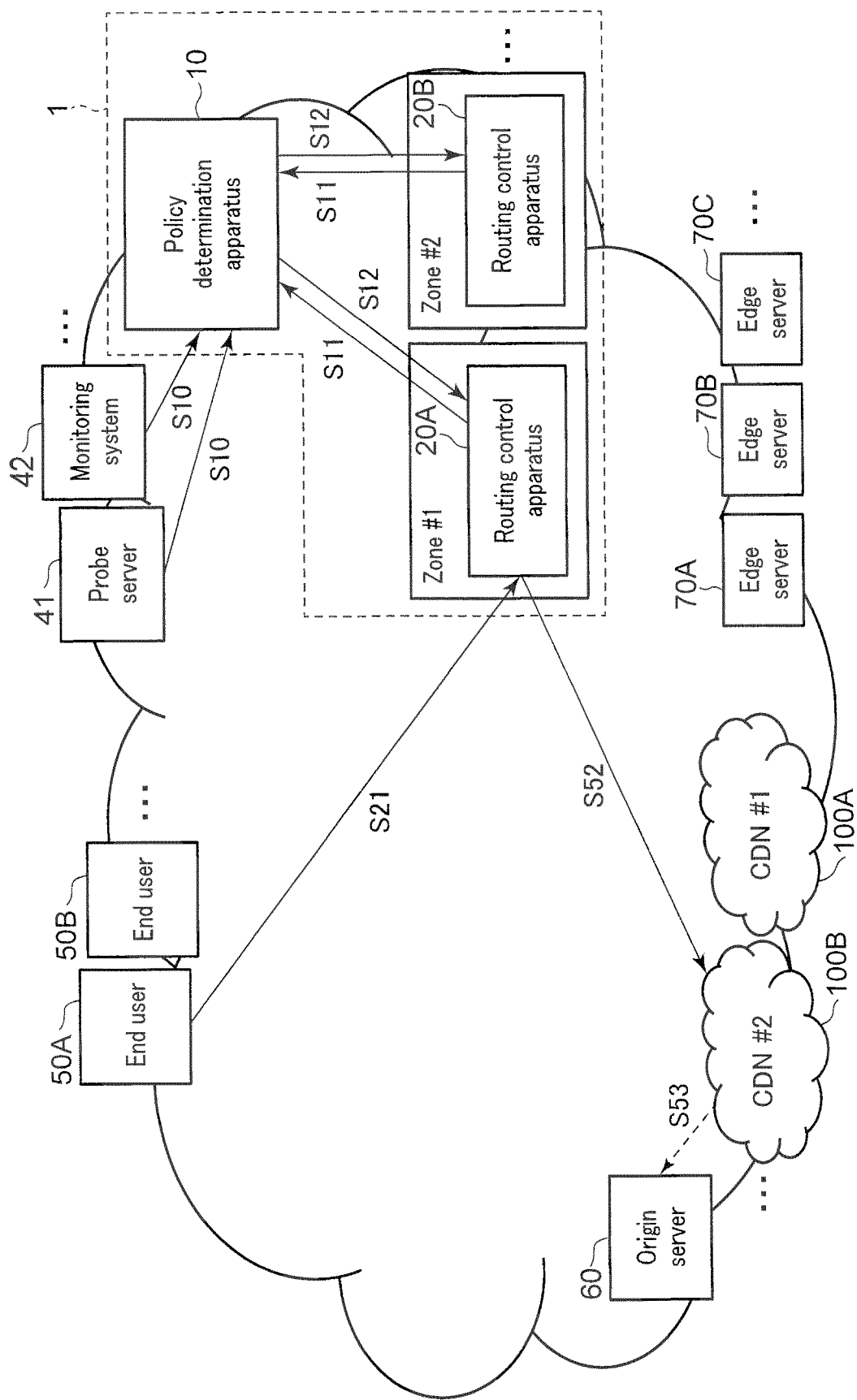
FIG. 1D is a diagram showing another exemplary load distribution system including a policy determination apparatus according to the present embodiment.

FIG. 1D is a diagram showing the fourth example of the overall configuration of the load distribution system including the policy determination apparatus 10 according to the present embodiment and the processing flow of the system. In particular, FIG. 1D shows a flow of a process in which, when the end user 50A is trying to access the origin server 60 to request distribution of a content, the routing control apparatus 20A designates the CDN 100 instead of an edge server 70 as a routing destination. Steps S10 to S12 in FIG. 1D are the same as steps S10 to S12 in FIGS. 1A to 1C, and therefore these steps are omitted from the explanation. Furthermore, step S21 in FIG. 1D is the same as step S21 in FIG. 1C, and therefore this step is omitted from the explanation.

At step S52, which follows step S21, the routing control apparatus 20A selects the CDN 100B as a routing destination in accordance with the policy stored in the storage unit, and transfers the HTTP request to the CDN 100B. Here, the routing control apparatus 20A may take into consideration the description of the request included in the HTTP request, the type of target data, information of the end user 50A, and the like, in addition to the policy, when selecting the routing destination. If the edge server to which the HTTP request is transferred in the CDN 100B holds the cache of the content requested by the end user 50A, the process is terminated.

If the edge server in the CDN 100B does not hold the cache of the content requested by the end user 50A, the request is further transferred by this edge server to the origin server 60 at step S53.

As a result, the routing destination designated by the routing control apparatus 20A is allowed to deliver the content held by the origin server 60 to the end user 50A.

At step S22, it is possible that the routing control apparatus 20A may designate the origin server 60 instead of an edge server as a routing destination.

When the end user 50 wishes to upload data to the origin server 60, the end user 50 is also required to send a request to the origin server 60 or a suitable edge server. The above flow is therefore applicable regardless of whether the flow of the targeted data of a request is in a downstream direction or upstream direction.

The routing control system 1 including the routing control apparatuses 20A, 20B, . . . explained above with reference to FIGS. 1C and 1D is capable of controlling the routing destination of an HTTP request from an end user 50 in a dynamic and intelligent manner. That is, the policy determination apparatus 10 serves as the brain to dynamically determine a policy based on the collected monitoring data. The routing control apparatus 20 arranged in each zone performs the actual operation, selecting a suitable routing destination from a plurality of edge servers in accordance with the policy defined by the policy determination apparatus 10 serving as the brain.

The routing control system 1 may be configured to select a routing destination in accordance not only with the policy but also with the information included in the HTTP request. In general, an HTTP request includes information of the end user 50 and information relating to the to-be-transmitted data. The routing control system 1 therefore may be configured to change the routing destination in accordance with the device type or agent of the end user 50 or the type or content of the transmission target data.

With respect to the edge servers to which nonzero proportions are assigned according to the policy, the routing control apparatus 20 in the routing control system 1 may use these proportional values as weights for the weighted round robin when sorting the requests. The policy determination apparatus 10 in the routing control system 1 may determine different policies for different time frames, for example between daytime and nighttime.

In particular, when viewed from the content side, the available services and functions vary among CDNs 100 provided by different CDN business operators. With the routing control apparatus 20, the requests may be received at the CDNs 100 of the CDN business operators, and then routed to a specific edge server 70 so that the variations will become unnoticeable from the content side.

Embodiments

With reference to the drawings, the policy determination apparatus according to the present embodiment will be explained. In the following explanation, the routing control apparatus 20 and routing control apparatus 30 are basically not distinguished from each other, and will be referred to as routing control apparatuses 20.

(1) Configuration

As illustrated in FIG. 2, the policy determination apparatus 10 according to the present embodiment includes a communication interface (I/F) 110, a processor 120, and a memory 140.

The communication I/F 110 may include one or more wired or wireless communication interface units, enabling transmission and reception of information with respect to the probe server 41 and/or monitoring system 42 and not-shown other external devices such as customer devices in accordance with a communication protocol used for the network. The communication I/F 110 is also used for data communications with the routing control apparatuses 20. The communication I/F 110 may be an optical communication module.

The processor 120 is typically a central processing unit (CPU) and/or a graphics processing unit (GPU). The processor 120 may also be a microcomputer, a field programmable gate array (FPGA), a digital signal processor (DSP), or any other general-purpose or dedicated processor. The processor 120 may perform processing relating to input/output control, communication control, policy determination, and the like.

The memory 140 temporarily stores programs to be executed by the processor 120, with which the processor 120 can implement the processing, and data to be used by the processor 120, such as monitoring data, metrics data, setting data, routing destination evaluation data, and policies. The memory may include a random access memory (RAM) having a work area onto which the program or data is loaded.

By executing the program stored in the memory 140, the processor 120 may function as a monitoring data acquisition unit 121, a metrics generation unit 122, an update condition determination unit 123, an update request unit 124, a routing destination evaluation unit 125, a policy determination unit 126, a policy notification unit 127, a metrics providing request acquisition unit 128, a metrics providing unit 129, an evaluation providing request acquisition unit 130, and an evaluation providing unit 131 illustrated in FIG. 2. The memory 140 may include a monitoring data storage unit 141, a metrics storage unit 142, a setting data storage unit 143, an evaluation data storage unit 144, and a policy storage unit 145 illustrated in FIG. 2.

The communication I/F 110 is configured to receive various kinds of data from external devices and transmit it to the processor 120, or to transmit various kinds of data received from the processor 120 to external devices.

For instance, the communication I/F 110 receives monitoring data relating to the states of the facilities on a network from the probe server 41 or monitoring system 42 via the network, and forwards this to the monitoring data acquisition unit 121. Here, the monitoring data may include data indicating the states of candidates, such as edge servers 70 and/or CDNs 100, which can be selected by the routing control apparatuses 20 subordinate to the policy determination apparatus 10 as a routing destination of a request including destination data from an end user 50 to the origin server 60. The states of the routing destination candidates here may include, or may not include, some or all of the loads of the candidates, response time (e.g., round-trip time ((RTT)), costs (communication charges), availability, the number of connections, the number of clients, volume of data communications, and the like.

Furthermore, the communication I/F 110 receives from the policy notification unit 127 the policy and the data (e.g., address) that identifies a routing control apparatus 20 that is a policy notification destination and that is subordinate to the policy determination apparatus 10, and transmits the policy to this routing control apparatus 20 via a network. This policy is used by the routing control apparatus 20 that is the notification destination to regulate the destinations for routing the requests including the destination data from the end users 50 to the origin server 60.

The communication I/F 110 further receives a metrics providing request and/or evaluation providing request, which will be described later, from an external device via a network, and transmits the requests to the metrics providing request acquisition unit 128 and/or evaluation providing request acquisition unit 130. On the other hand, the communication I/F 110 receives the metrics targeted by the metrics providing request and data that identifies the requesting external device from the metrics providing unit 129, and transmits the metrics to the external device via the network. The communication I/F 110 further receives the routing destination evaluation data targeted by the evaluation providing request and data that identifies the requesting external device from the evaluation providing unit 131, and transmits the routing destination evaluation data to the external device via the network.

The monitoring data acquisition unit 121 acquires the monitoring data received by the communication I/F 110, and writes this data into the monitoring data storage unit 141 of the memory 140.

The monitoring data storage unit 141 stores the monitoring data acquired by the monitoring data acquisition unit 121. The monitoring data stored in the monitoring data storage unit 141 may be read out by the metrics generation unit 122.

The monitoring data storage unit 141 stores the monitoring data in association with respective edges. FIG. 6 is a diagram showing an exemplary content stored in this monitoring data storage unit 141. The monitoring data storage unit 141 stores similar information for every origin server 60. Here, the data is presented in the form of a table, which is not a limitation. The monitoring data storage unit 141 stores information of defined metrics such as a quality including availability and round-trip time (RTT), a cost, and the like, for each edge. The cost denotes a value calculated based on various fees including transit fees corresponding to the volume of data transmission and reception and electric power charges for running the edge servers. The monitoring data may be throughputs, the number of requests or any other type of data, and any information acquirable at the probe server 41 and/or monitoring system 42 can be adopted. The monitoring data can be freely defined by the server of a company or organization that runs and manages this routing control system 1, or by the origin server 60 or customer device that is run and managed by a content distributor or an IoT data collecting business operator.

The metrics generation unit 122 reads the monitoring data stored in the monitoring data storage unit 141, and generate, based on the monitoring data, time-series data (metrics data) of multiple types of metrics associated with routing destination candidates. The metrics generation unit 122 stores the generated metrics data in the metrics storage unit 142.

As mentioned above, the metrics are an indicator that indicates the state of a candidate selectable as a request routing destination. The metrics data is expressed by a time stamp and metrics values. The metrics at a given time point may be a value as-is contained in the monitoring data, or a manipulated value or statistical value of this contained value. The metrics generation unit 122 may generate metrics for every unit of time, for example, every second.

The metrics generation unit 122 may normalize the metrics value of a given type at a given time point, for example as a score between 0 and 1. The metrics generation unit 122 may use a sigmoid function to normalize the metrics value. The normalized metrics value may be referred to as a (metrics) score.

Upon receiving a metrics providing request from the metrics providing unit 129, the metrics generation unit 122 may generate metrics targeted by this request. The metrics providing request may include information designating the requested edge, period and/or type of metrics. In other words, in response to a metrics providing request, providing of time-series data of a specific type of metrics for a specific edge over a specific period of time can be realized.

The metrics associated with a given routing destination candidate may include first metrics relating to a transmission cost of a request when this candidate is selected as a routing destination, second metrics relating to a transmission quality of a request when this candidate is selected as a routing destination, and the like. The first metrics may be various costs incurred when the candidate is selected, such as CDN charge as a candidate, electric power charge of the edge server as a candidate, and the like. The second metrics may be availability, RTT, packet loss rate of the edge, and the like.

The metrics storage unit 142 may store, as metrics data, multiple types of metrics values of the candidates and/or their scores at a given time point in association with the routing destination candidates. FIG. 7 shows an example of RTT and a cost corresponding to the metrics, as well as their scores, for each routing destination candidate (edge). Here, the metrics data is indicated in the form of a table, which is not a limitation. The metrics storage unit 142 may store a value and a score for each edge and for each item of the metrics. The metrics data stored in the metrics storage unit 142 may be read out by the update condition determination unit 123, routing destination evaluation unit 125, policy determination unit 126, and/or metrics providing unit 129.

The setting data storage unit 143 stores various types of setting data. The setting data here may include parameters relating to the policy determination, data relating to the routing control apparatuses 20 subordinate to the policy determination apparatus 10, data relating to the routing destination candidates that can be selected by the routing control apparatus 20, and the like.

The parameters relating to the policy determination may include priorities assigned to respective items of the metrics, which are used for scoring the routing destination candidates with a weighted sum of the metrics, parameters (designated number of edges) designating the number of routing destination candidates that can be included in the policy and/or later-mentioned ranking, various threshold values, and the like.

The setting data storage unit 143 stores various parameters. These parameters include standard values designated by the server of a company or organization that runs and manages this routing control system 1 or by the origin server 60 or customer device that is run and managed by a content distributor or an IoT data collecting business operator. The parameters may also include arbitrary values that have been set through the API or the like by an external device that requires the later-mentioned routing destination evaluation data. The arbitrary values are transmitted from the external device together with an evaluation providing request, or in association with the evaluation providing request, and are stored in the setting data storage unit 143 by the evaluation providing request acquisition unit 130 that has acquired the arbitrary values via the communication I/F 110. FIG. 8 is a diagram showing an exemplary content stored in this setting data storage unit 143. The setting data storage unit 143 stores similar information for every origin server 60. The setting data storage unit 143 stores the priorities and the designated number of edges k. In this example, priorities are set with respect with two types of metrics, RTT and a cost. The metrics for the priorities are set, however, are not limited to these, and the number of metrics types is also not limited to two.

The update condition determination unit 123 determines whether or not a predetermined policy update condition is satisfied. When it is determined that the policy update condition is satisfied, the update condition determination unit 123 notifies the update request unit 124 that the policy update condition has been satisfied. If there are a plurality of routing control apparatuses 20 subordinate to the policy determination apparatus 10, the update condition determination unit 123 may determine, for every routing control apparatus 20, whether or not the policy update condition of the policy used by this routing control apparatus 20 is satisfied.

For instance, the policy update condition may be that the metrics and/or their scores stored in the metrics storage unit 142 either have been changed or have changed beyond a threshold value. Alternatively, the policy update condition may be that a length of time that exceeds a threshold value has elapsed after the previous policy update (or determination). The policy update condition may be that a policy update request is received from a routing control apparatus 20 subordinate to the policy determination apparatus 10 and is stored in the memory 140.

Upon the notification from the update condition determination unit 123 of the policy update condition being satisfied, the update request unit 124 sends a request for a policy update to the policy determination unit 126.

The routing destination evaluation unit 125 reads the metrics data from the metrics storage unit 142, and the parameters including priorities from the setting data storage unit 143. Based on the metrics data and parameters, the routing destination evaluation unit 125 evaluates the routing destination candidates to generate the routing destination evaluation data. The routing destination evaluation unit 125 stores the routing destination evaluation data in the evaluation data storage unit 144.

The routing destination evaluation unit 125 may regularly perform evaluations of the routing destination candidates, or a request from the policy determination unit 126 may trigger the evaluation of the routing destination candidates. Alternatively, upon receiving an evaluation providing request from the evaluation providing unit 131, the routing destination evaluation unit 125 may generate routing destination evaluation data targeted by this request. The evaluation providing request may include routing destination candidates targeted by the request, priorities, a designated number of edges, and the like.

The routing destination evaluation unit 125 may evaluate routing destination candidates based on the time-series data of multiple types of metrics associated with these candidates, and the priorities assigned to the metrics of these types. For instance, the routing destination evaluation unit 125 may determine the evaluation value (edge score) of each routing destination candidate by adding (the scores of) multiple types of metrics of the candidate weighted in accordance with the priorities assigned to types of the metrics. An example of scoring is shown in FIG. 9. "Edge 1", "Edge 2", . . . and "Edge 7" in FIG. 9 correspond to the routing destination candidates, and the priorities assigned to the "RTT score" and "cost score" are "0.8" and "0.2", respectively. The priorities may be set in accordance with the preferences of the administrator of the policy determination apparatus 10, routing control apparatus 20, and/or origin server 60. In the example of FIG. 9, greater importance is placed on "RTT" than "cost". However, greater importance may be placed on "cost" instead, or on (the scores of) metrics other than "cost" and "RTT".

The routing destination evaluation data includes, for example, the routing destination candidates and their evaluation values (edge scores). Furthermore, the routing destination evaluation data may be ranking data in which routing destination candidates are ranked in ascending or descending order of the evaluation values.

When generating ranking data as routing destination evaluation data, the routing destination evaluation unit 125 does not need to include all the edges in the ranking. In particular, the routing destination evaluation unit 125 may take the edges having the first to k-th scores into consideration for the ranking in accordance with the designated number of edges k, which is one of the parameters stored in the setting data storage unit 143, or may eliminate candidates that are not in an available state.

The evaluation data storage unit 144 stores the routing destination evaluation data generated by the routing destination evaluation unit 125. The routing destination evaluation data stored in the evaluation data storage unit 144 may be read out by the policy determination unit 126, evaluation providing unit 131 or the like.

The policy determination unit 126 determines the policy based on various types of data stored in the memory 140 and writes it into the policy storage unit 145 at the time of, for example, initial setting of the policy determination apparatus 10, setting of an additional routing control apparatus 20 subordinate to the policy determination apparatus 10, or a request for a policy update received from the update request unit 124. To determine the policy, the policy determination unit 126 may refer to the metrics stored in the metrics storage unit 142, setting data stored in the setting data storage unit 143, and/or routing destination evaluation data stored in the evaluation data storage unit 144. Before determining the policy, the policy determination unit 126 may request that the routing destination evaluation unit 125 generate the latest routing destination evaluation data.

The policy determination unit 126 may narrow down the routing destination candidates to be included in the policy, based on the scores of the routing destination candidates and/or the availability or other metrics of the candidates. For instance, the policy determination unit 126 may eliminate candidates having edge scores ranked in a place below the predetermined ordinal place, such as below a place corresponding to the designated number of edges, in the routing destination evaluation data. Alternatively, the policy determination unit 126 may eliminate candidates having scores lower than a predetermined threshold value, or candidates that are not in the available state.

The policy determination unit 126 determines, based on the scores of the routing destination candidates, weights indicating the proportions of candidates to which the routing control apparatus 20 that will use the to-be-determined policy routes the requests. As indicated in FIG. 10, for instance, the policy determination unit 126 may determine, as the weight of each candidate, the ratio of the score of a candidate to the total score of all the routing destination candidates to be included in the policy. This is an exemplary method for determining weights, and the weights may be predetermined in accordance with the order of scores. The weights may be used as weights for the weighted round robin scheme in the load distribution technique. That is, the routing control apparatus 20 using the policy of FIG. 10 routes 55% of the requests to the edge 1, and the remaining 45% to the edge 7.

The policy storage unit 145 stores the policy determined by the policy determination unit 126. The policy stored in the policy storage unit 145 is read out, for example, by the policy notification unit 127.

When a new policy (including an updated policy) is stored in the policy storage unit 145, the policy notification unit 127 reads this policy out, and notifies the corresponding routing control apparatus 20 of the policy. Specifically, the policy notification unit 127 transmits to the communication I/F 110 the policy and the data that identifies the routing control apparatus 20 to which the policy is reported, and the communication I/F 110 transmits the policy to this routing control apparatus 20 via a network.

The metrics providing request acquisition unit 128 acquires a metrics providing request transmitted from an external device and received by the communication I/F 110. Here, the target of the metrics providing request may include at least a portion of the time-series data of the metrics of multiple types associated with at least one of the routing destination candidates. The metrics providing request acquisition unit 128 forwards the metrics providing request to the metrics providing unit 129.

The metrics providing unit 129 receives the metrics providing request from the metrics providing request acquisition unit 128. The metrics providing unit 129 prepares metrics data targeted by this request, and provides this data to the request source via the communication I/F 110. Here, the metrics providing unit 129 may extract necessary data from the metrics data stored in the metrics storage unit 142, or may send a request for generation of the necessary data to the metrics generation unit 122.

The evaluation providing request acquisition unit 130 acquires an evaluation providing request transmitted from an external device and received by the communication I/F 110. Here, the target of the evaluation providing request may include at least one of the routing destination candidates. The evaluation providing request acquisition unit 130 forwards an evaluation providing request to the evaluation providing unit 131.

The evaluation providing unit 131 receives the evaluation providing request from the evaluation providing request acquisition unit 130. The evaluation providing unit 131 prepares routing destination evaluation data targeted by this request, and provides this data to the request source via the communication I/F 110. The evaluation providing unit 131 may extract necessary data from the routing destination evaluation data stored in the evaluation data storage unit 144, or send a request for generation of the necessary data to the routing destination evaluation unit 125.

(2) Operations

Next, the operations of the policy determination apparatus 10 configured as above will be described.

Figure 3:
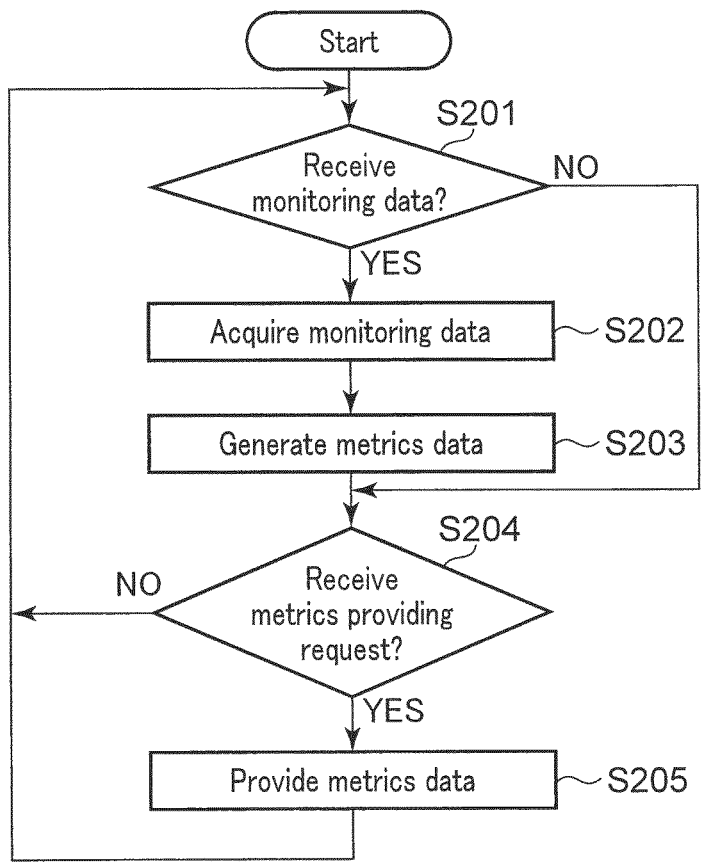
FIG. 3 is a flowchart showing an exemplary operation performed by the policy determination apparatus of FIG. 2 in relation to metrics data.

FIG. 3 shows an exemplary operation performed by the policy determination apparatus 10 in relation to the metrics data. In the exemplary operation of FIG. 3, the communication I/F 110 awaits reception of monitoring data and a metrics providing request (steps S201 and S204). Upon receipt of the monitoring data by the communication I/F 110, the process proceeds to step S202. Upon receipt of a metrics providing request by the communication I/F 110, the process proceeds to step S205.

At step S202, the monitoring data acquisition unit 121 acquires the received monitoring data, and writes it into the monitoring data storage unit 141. Then, the metrics generation unit 122 generates metrics data based on the monitoring data acquired at step S202 (step S203). For instance, the metrics generation unit 122 may generate metrics data that includes a new time stamp, and metrics and/or score values of the metrics. After step S203, the communication I/F 110 awaits reception of monitoring data and a metrics providing request (steps S201 and S204).

At step S205, the metrics providing unit 129 prepares metrics data corresponding to the received metrics providing request, and provides the data to the external device, which is the source of the request, via the communication I/F 110. After step S205, the communication I/F 110 awaits reception of monitoring data and a metrics providing request (steps S201 and S204).

Figure 4:
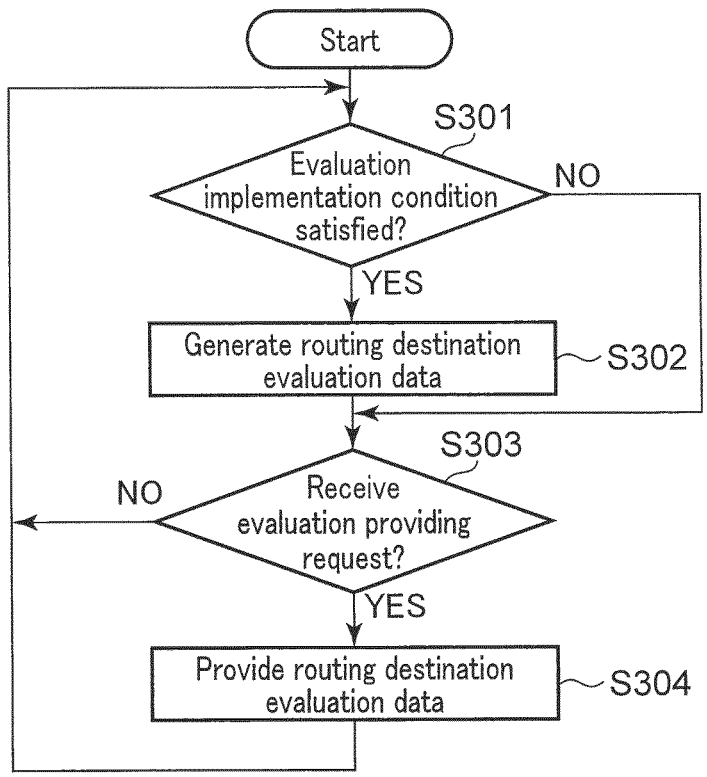
FIG. 4 is a flowchart showing an exemplary operation performed by the policy determination apparatus of FIG. 2 in relation to the routing destination evaluation data.

FIG. 4 shows an exemplary operation performed by the policy determination apparatus 10 in relation to the routing destination evaluation data. In the exemplary operation of FIG. 4, the routing destination evaluation unit 125 awaits satisfaction of an evaluation implementation condition (step S301), and the communication I/F 110 awaits the reception of an evaluation providing request (step S303). If the routing destination evaluation unit 125 is configured to evaluate routing destination candidates at regular intervals, the evaluation implementation condition here may represent a predetermined period of time being elapsed after the previous implementation. The evaluation implementation condition may be that the routing destination evaluation unit 125 receives a request for implementing an evaluation from the policy determination unit 126 or evaluation providing unit 131. When the evaluation implementation condition is satisfied, the process proceeds to step S302, and when an evaluation providing request is received, the process proceeds to step S304.

At step S302, the routing destination evaluation unit 125 evaluates the routing destination candidates based on the metrics data stored in the metrics storage unit 142, parameters including the priorities stored in the setting data storage unit 143, and the like to generate the routing destination evaluation data. After step S302, the routing destination evaluation unit 125 awaits satisfaction of the evaluation implementation condition (step S301), and the communication I/F 110 awaits the reception of an evaluation providing request (step S303).

At step S304, the evaluation providing unit 131 prepares routing destination evaluation data corresponding to the received evaluation providing request, and provides the data to the external device, which is the source of the request, via the communication I/F 110. After step S304, the routing destination evaluation unit 125 awaits satisfaction of the evaluation implementation condition (step S301), and the communication I/F 110 awaits the reception of an evaluation providing request (step S303).

Figure 5:
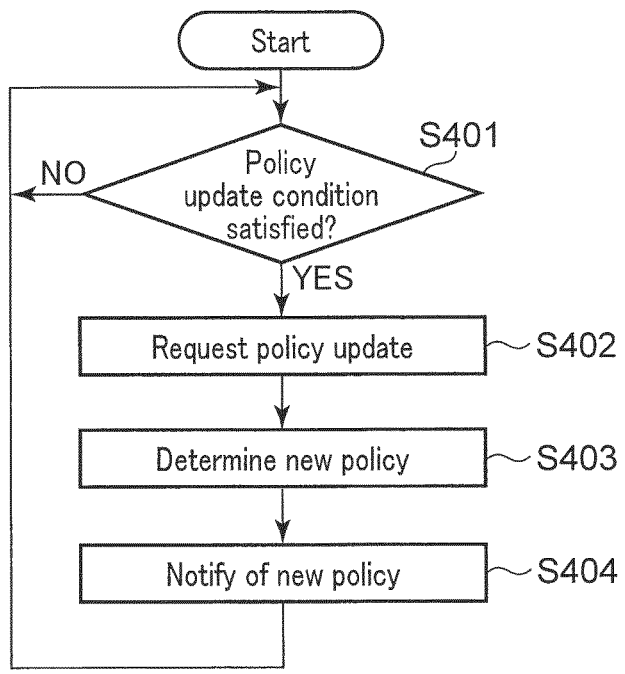
FIG. 5 is a flowchart showing an exemplary operation performed by the policy determination apparatus of FIG. 2 in relation to the policy.

FIG. 5 shows an exemplary operation performed by the policy determination apparatus 10 in relation to the policy. In the exemplary operation of FIG. 5, the update condition determination unit 123 awaits the satisfaction of the policy update condition (step S401). When the policy update condition is satisfied, the process proceeds to step S402.

At step S402, the update request unit 124 requests the policy determination unit 126 to update the policy. In response to the request at step S402, the policy determination unit 126 determines a new policy based on the routing destination evaluation data stored in the evaluation data storage unit 144 and the like (step S403). The policy notification unit 127 notifies the routing control apparatus 20 of the policy determined at step S403 (step S404). After step S404, the update condition determination unit 123 awaits again the satisfaction of the policy update condition (step S401).

(3) Advantageous Effects

As described above, the policy determination apparatus according to the present embodiment generates time-series data of types of metrics associated with each of routing destination candidates to which the routing control apparatus routes the requests, evaluates the candidates based on this time-series data to generate routing destination evaluation data, and, determines based on the routing destination evaluation data the policy to be used for the routing control apparatus to control the routing destinations. The policy determination apparatus is therefore capable of dynamically determining the policy.

Furthermore, upon receipt of a metrics providing request from an external device on the network via the communication I/F, the policy determination apparatus transmits the request-targeted metrics data to the external device, which is the request source, via the communication I/F. In this manner, new services can be provided to external devices.

In addition, upon receipt of an evaluation providing request from an external device on the network via the communication I/F, the policy determination apparatus transmits the request-targeted routing destination evaluation data to the external device, which is the request source, via the communication I/F. In this manner, new services can be provided to external devices.

In the above embodiment, an external device that issues to the policy determination apparatus a request for providing metrics data or routing destination evaluation data is not specifically defined. The configuration may be such that metrics data or routing destination evaluation data will be provided through authentication control to specific external devices only. For such data providing, billing control may be incorporated based on the amount of data provided, such as the number of edges included in the routing destination evaluation data or types of metrics included in the metrics data.

In addition to the above, the configuration and processing procedure of the policy determination apparatus and the configurations of information storage units can be modified in various manners without departing from the spirit of the present invention.

The present invention should not be limited to the above-described embodiments as-is, but may be embodied by modifying the components without departing from the scope of the invention at the implementation stage. In addition, various inventions may be constituted by appropriately combining a plurality of components disclosed in the embodiments. For example, some components may be omitted from the components shown in the embodiments. Furthermore, the components of different embodiments may be suitably combined.

REFERENCE SIGNS LIST

1 Routing control system
10 Policy determination apparatus
20, 20A, 20B, 30, 30A, 30B Routing control device
41 Probe server
42 Monitoring system
50, 50A, 50B End user
60 Origin server
70, 70A, 70B, 70C Edge server
80 DNS resolver
90 Authoritative DNS server
100, 100A, 100B CDN
110 Communication I/F
120 Processor
121 Monitoring data acquisition unit
122 Metrics generation unit
123 Update condition determination unit
124 Update request unit
125 Routing destination evaluation unit
126 Policy determination unit
127 Policy notification unit
128 Metrics providing request acquisition unit
129 Metrics providing unit
130 Evaluation providing request acquisition unit
131 Evaluation providing unit
140 Memory
141 Monitoring data storage unit
142 Metrics storage unit
143 Setting data storage unit
144 Evaluation data storage unit
145 Policy storage unit

The invention claimed is:

1. A policy determination apparatus comprising:
a hardware processor configured to:
acquire monitoring data relating to states of facilities on a network, the monitoring data being received from an external device;
generate, based on the monitoring data, time-series data of a plurality of types of metrics associated with each of a plurality of candidates of routing destinations to which a routing control apparatus routes requests including first destination data;
evaluate the candidates based on the time-series data of the types of metrics associated with the candidates to generate routing destination evaluation data including evaluation values of the candidates;
generate or update, based on the routing destination evaluation data, a policy that the routing control apparatus uses for control of the routing destinations, wherein the policy indicates the plurality of candidates of routing destinations and proportions at which the requests are routed to the candidates, and the generating or updating of the policy comprises deriving the proportions from the evaluation values of the candidates included in the routing destination evaluation data; and
notify the routing control apparatus of the policy.

2. The policy determination apparatus according to claim 1, wherein
the hardware processor is further configured to evaluate the candidates based on the time-series data of the types of metrics associated with the candidates and priorities assigned to the types of metrics.

3. The policy determination apparatus according to claim 2, wherein
the hardware processor is further configured to calculate, for each of the candidates, an evaluation value of the candidate by adding values weighted in accordance with the priorities, the values being based on the time-series data of the types of metrics corresponding to the candidate.

4. The policy determination apparatus according to claim 1, wherein
the hardware processor is further configured to generate or update the policy such that the routing control apparatus routes the requests to the candidates in proportions being based on the evaluation values.

5. The policy determination apparatus according to claim 1, wherein the hardware processor is further configured to:
determine, based on a change in the metrics or a change in scores derived from the metrics, whether or not a predetermined policy update condition is satisfied;
issue a policy update request when the policy update condition is determined to be satisfied;
update the policy in response to the policy update request; and
notify the routing control apparatus of the updated policy.

6. The policy determination apparatus according to claim 1, wherein
the types of metrics associated with a first candidate included in the candidates include first metrics relating to a transmission cost of a request when the first candidate is selected as a routing destination, and second metrics relating to a transmission quality of the request when the first candidate is selected as the routing destination.

7. The policy determination apparatus according to claim 1, wherein the hardware processor is further configured to:
acquire a metrics providing request for requesting at least a portion of time-series data of the types of metrics associated with at least one of the candidates; and
provide a source of the metrics providing request with data targeted by the metrics providing request.

8. The policy determination apparatus according to claim 1, wherein the hardware processor is further configured to:
acquire an evaluation providing request targeted for at least one of the candidates; and
provide a source of the evaluation providing request with routing destination evaluation data of the candidate that the evaluation providing request is targeted for.

9. A policy determining method comprising:
acquiring monitoring data relating to states of facilities on a network, the monitoring data being received from an external device;
generating, based on the monitoring data, time-series data of a plurality of types of metrics associated with each of a plurality of candidates of routing destinations to which a routing control apparatus routes requests including first destination data;
evaluating the candidates based on the time-series data of the types of metrics associated with the candidates to generate routing destination evaluation data including evaluation values of the candidates;
generating or updating, based on the routing destination evaluation data, a policy that the routing control apparatus uses for control of the routing destinations, wherein the policy indicates the plurality of candidates of routing destinations and proportions at which the requests are routed to the candidates, and the generating or updating of the policy comprises deriving the proportions from the evaluation values of the candidates included in the routing destination evaluation data; and
notifying the routing control apparatus of the policy.

10. A non-transitory computer readable medium storing a computer program which is executed by a computer to provide the steps of:
acquiring monitoring data relating to states of facilities on a network, the monitoring data being received from an external device;
generating, based on the monitoring data, time-series data of a plurality of types of metrics associated with each of a plurality of candidates of routing destinations to which a routing control apparatus routes requests including first destination data;
evaluating the candidates based on the time-series data of the types of metrics associated with the candidates to generate routing destination evaluation data including evaluation values of the candidates;
generating or updating, based on the routing destination evaluation data, a policy that the routing control apparatus uses for control of the routing destinations, wherein the policy indicates the plurality of candidates of routing destinations and proportions at which the requests are routed to the candidates, and the generating or updating of the policy comprises deriving the proportions from the evaluation values of the candidates included in the routing destination evaluation data; and
notifying the routing control apparatus of the policy.

* * * * *